Aug. 19, 1958 A. F. HUBBARD 2,848,241
COLLAPSIBLE TRAILER CONVERTIBLE FROM WHEELED
VEHICLE TO RUNNER SUPPORTED VEHICLE
Filed March 29, 1954 2 Sheets-Sheet 1

INVENTOR.
ARTHUR FRANCIS HUBBARD
BY
ATTORNEY

Aug. 19, 1958   A. F. HUBBARD   2,848,241
COLLAPSIBLE TRAILER CONVERTIBLE FROM WHEELED
VEHICLE TO RUNNER SUPPORTED VEHICLE
Filed March 29, 1954   2 Sheets-Sheet 2
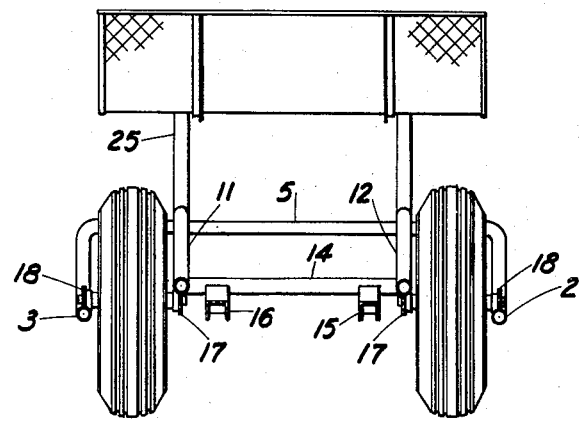
Fig. 3
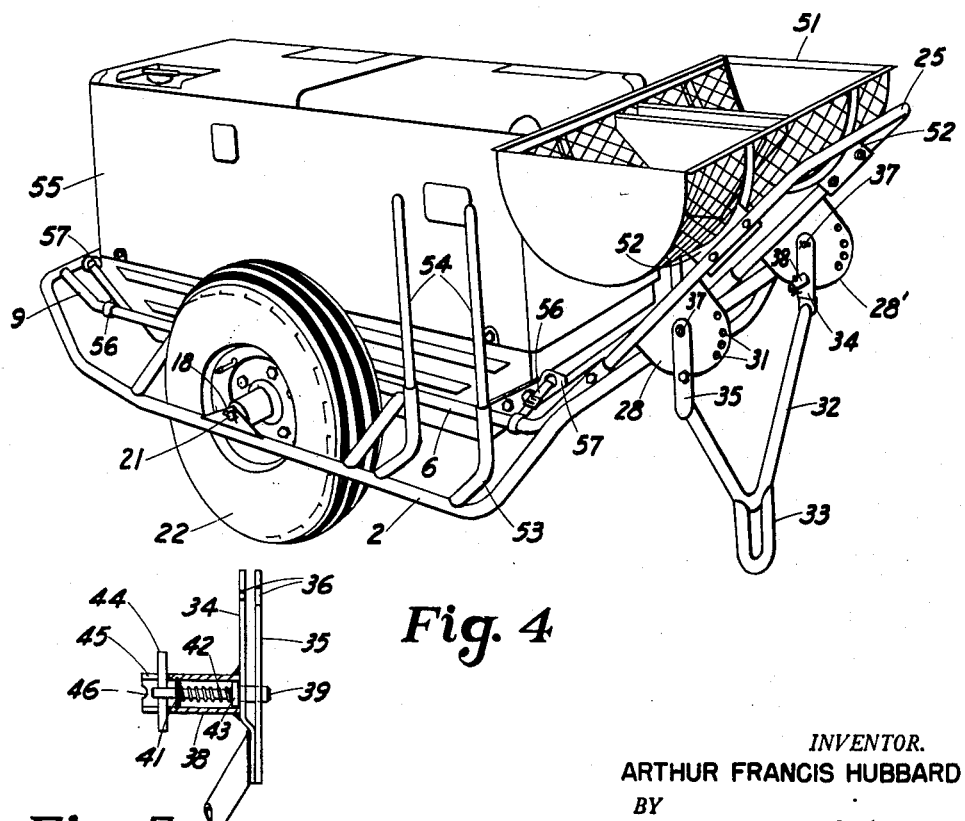
Fig. 4
Fig. 5
INVENTOR.
ARTHUR FRANCIS HUBBARD
BY
Arthur Robert
ATTORNEY

United States Patent Office 2,848,241
Patented Aug. 19, 1958

2,848,241

COLLAPSIBLE TRAILER CONVERTIBLE FROM WHEELED VEHICLE TO RUNNER SUPPORTED VEHICLE

Arthur Francis Hubbard, Moline, Ill., assignor to American Air Filter Company, Inc., Louisville, Ky., a corporation of Delaware Application March 29, 1954, Serial No. 419,248

6 Claims. (Cl. 280—8)

This invention relates to a trailer vehicle, particularly designed for transporting a portable heater.

Portable heaters are used by the military forces in cold climates for heating living quarters or airplane hangars, for starting gasoline engines in cold weather, and the like. Such heaters often must be transported over rough terrain and over deep snow to the place where they are to be used.

It is an object of this invention to provide a trailer vehicle embodying a toboggan structure which may be converted easily and quickly to a wheeled structure, so that the trailer may be transported on roads or over snow.

Another object is the provision of a trailer vehicle which is easily assembled or disassembled, and which may serve as a wheeled trailer or as a toboggan.

Another object of the present invention is to provide a light weight trailer in which the trailer chassis provides a spring mounting for the trailer wheels.

A further object is the provision of a light weight trailer having a tow bar which may serve as a foot or stand to support the trailer when it is detached from the tow vehicle.

Another object is the provision of a light weight trailer for carrying a portable heater on which the heater is easily mounted or detached, and which securely holds the heater during transportation.

Another object is the provision of a wheeled trailer which offers little resistance in traveling through deep snow.

These and other objects will be apparent upon consideration of the accompanying drawings illustrating a preferred embodiment of the invention by way of example, and wherein:

Figure 3 is a section taken on line III—III of Figure 2;

Figure 4 is a perspective view of the trailer carrying a heater; and

Figure 5 is a fragmentary view of a detail.

Figure 1:
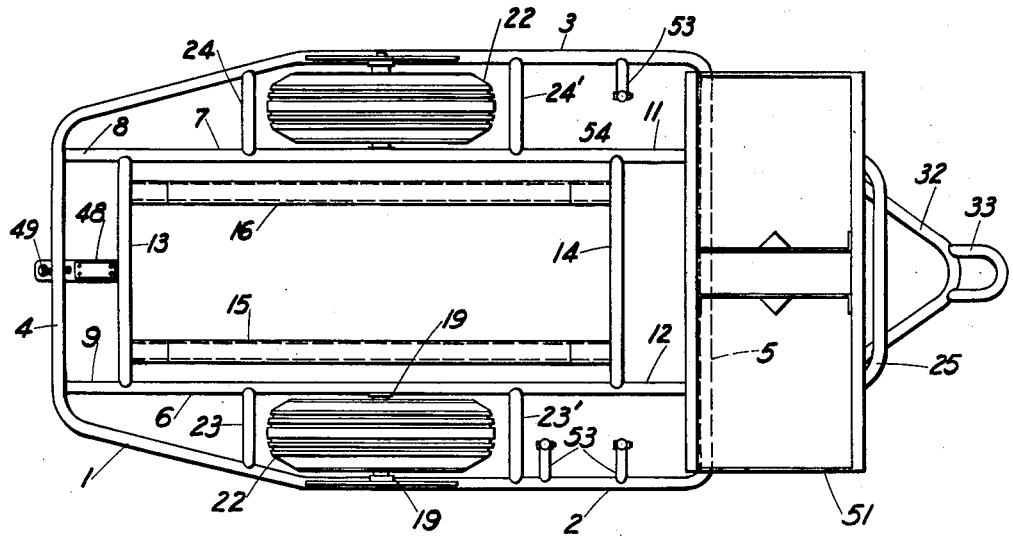
Figure 1 is a plan view of a trailer embodying the invention.
Figure 2:
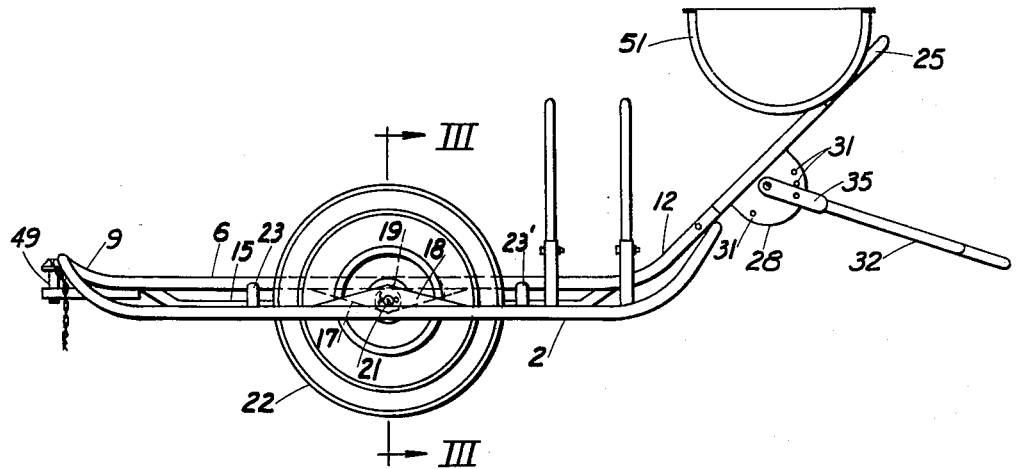
Figure 2 is a side view of Figure 1.

Referring to the drawing, the trailer chassis includes an outer frame 1 of generally rectangular shape made up of longitudinally extending side bars 2, 3 and transverse end bars 4, 5. This frame preferably is constructed of a single length of cold rolled steel tubing bent to shape with the ends welded together, and as shown, the frame is somewhat tapered at the rear. An inner frame comprises longitudinally extending bars 6, 7 generally parallel to and located inwardly from bars 2, 3. It will be observed that both ends of bars 2, 3 are bent upwardly and the ends 8, 9, 11, 12 of bars 6, 7 are similarly bent upward, the ends 8, 9 being butt welded to the bar 4, and the ends 11, 12 being cross welded to bar 5. Cross stays 13 and 14 of steel tubing may be welded to bars 6, 7 adjacent and inwardly from transverse bars 4, 5, these stays preferably being secured at or inwardly from the point where the bars 6, 7 bend upwardly. It will be noted that bars 6, 7 are at a higher elevation than bars 2, 3 and the purpose of this will be later explained. Bottom bars 15 and 16 made up of offset inverted channel members are welded at their ends to stays 13 and 14.

Inner bars 6, 7 each have a wheel bracket 17 depending from their respective bottom surfaces and secured thereto by welding, and similar brackets 18 are welded to the upper surfaces of bars 2 and 3. The brackets each have suitable spacing collars 19 welded thereto, and a removable axle 21 passes through the collars and suitable apertures in each pair of brackets 17, 18 and is held against removal by cotter pins or the like. Each axle carries a wheel 22 journalled thereon. If desired, pairs of stays 23, 23′ and 24, 24′ may be welded to pairs of bars 2, 6 and 3, 7 respectively to provide lateral braces.

The handle 25 comprises a tube or bar bent into a U-shape, the ends of the handle being received in the open ends 11, 12 of the bars 7, 6 and being held therein by suitable bolts or pins. Mounted on the handle as by welding are the segments 28, 28′ each having a central hole therein and locking holes 31 adjacent its periphery. A tow bar 32 of general U-shape has a loop or bight 33 welded to its middle, and an offset plate 34 (Fig. 5) and a flat plate 35 are secured at each end of bar 32, the plates having aligned openings 36. A swivel bolt 37 passes through these openings and through the central opening of the segment. Each plate 34 has a tube or socket 38 welded thereto, and a plunger 39 passes through a retaining ring 41 in the sleeve and through aligned openings in the plates 34, 35. A spring 42 around plunger 39 engages a shoulder 43 on the plunger at one end and abuts the retaining ring at the other end, a suitable washer being interposed between the spring and retaining ring. A cross pin 44 extends through one end of the retaining pin, and the socket has axial slots 45 to receive the pin. Recesses 46 in the end of the socket are provided to receive cross pin 44 to hold the plunger retracted. The tow bar is assembled to the handle 25 by retracting the plunger 39 until cross pin 44 is free of recesses 45, turning plunger 39 till cross pin 44 is received in recess 46, and then a segment 28 is inserted between the plates 34, 35 and held in place by inserting the swivel pin 37. The plunger 39 then may be released to enter any of the holes 31 as desired to hold the tow bar in the desired position.

At the rear a hitch bar 48 in the form of an inverted channel bar is welded to bar 13 and braced by a bracket (not shown) on bar 4, this hitch having a pin 49 passing through a vertical aperture in the hitch bar and held against loss by a chain suitably attached to the frame. At the front a suitable basket 51 is provided having brackets 52 welded thereon, these brackets being attached to the handle 25 by suitable bolts. Socket members 53 are welded to the bars 2 and 3, receive extension posts 54 which are held in place by suitable blots.

The trailer is designed to carry a portable heater unit 55 as shown in Figure 4. The heater unit is received between bars 6, 7 and rests with its bottom on the channel bars 15, 16. It may be secured in place by straps 56 which are anchored to the bars 6 and 7 and pass through openings in the handle brackets 57 of the heater.

It should be noted that the pairs of bars 2, 6 and 3, 7 upon which the wheel axles are mounted provide a relative long span between the bent up end portions so as to provide a springy or resilient mounting for the axles and wheels to take road shocks. The bent up ends of bars 6, 7 confine the spring action substantially between the bends and relieve the strain from the junctures of the bars 6, 7 with transverse bars 4, 5. The inner frame made up of members 6, 13, 7 and 14 provide a well to receive the heater so that it cannot slide, and by having the bars 6, 7 higher than outer bars 2, 3 the bottom of the heater does not extend below the outer frame. The side members 2, 3 and turned up ends of the frame provide a toboggan structure so that when the wheels are removed the trailer may act as a toboggan in riding over snow, and if desired, the trailer front and bottom may be covered with a sheet metal plate to improve the toboggan action. During transportation, the draw bar 32 is connected to a suitable draft vehicle, and the bar may be locked by pins 39 at any desired angle to accommodate draft vehicles of different height. When the trailer is disconnected the draft bar 32 may act as a foot or stand, by locating the plunger in the lowermost hole 31, as shown in Figure 4. If desired, kick stands (not shown), such as are used on motorcycles may be attached to the rear of the frame to prevent overbalancing. The rear hitch bar 43 enables a number of such trailers to be hitched together in a train pulled by a single draft vehicle.

The trailer is easily disassembled for shipment. To disassemble the trailer, the axles and wheels are removed, the handle 25 is removed from the tube ends 12, the draw bar 32 is removed from segments 28, and the extensions are removed from sockets 53. The basket 51 also may be removed from the handle by disconnecting brackets 52. Thus, all the parts are relatively flat so that they can be crated in a small package for shipment. If desired, the crate may include the heater and may be dimensioned to allow the parts of the trailer to be included within the crate with the heater.

The basket 51 serves to carry the larger collapsible canvas heating ducts which are used in connection with the heater, and the smaller ducts provided for the heater may be threaded on the rods or posts 54.

I claim as my invention:

1. A vehicle comprising a pair of transversely disposed end bars, a pair of spaced outer longitudinally disposed bars each having upwardly bent portions adjacent the extremities thereof connecting to said transverse bars, a pair of inner longitudinally disposed bars spaced inwardly from said outer bars and having upwardly bent portions adjacent the extremities thereof connecting to said transverse bars, the portions of said inner longitudinally disposed bars disposed intermediate the bent end portions thereof being contained in a plane disposed intermediate a plane containing the portions of said outer bars disposed intermediate the bent extremities thereof and a plane containing said transversely disposed end bars, a pair of longitudinally spaced inner transverse load supporting bars connected intermediate said longitudinally disposed inner bars adjacent the upwardly bent end portions thereof to provide longitudinally spaced end supports for the load to be transported and means disposed adjacent the midlengths of said inner and outer longitudinally disposed bars for mounting wheels thereon and for selectively permitting unobstructed use of said outer bars as snow runners.

2. A vehicle as specified in claim 1 wherein said last mentioned means includes oppositely directed extensions to permit substantially horizontal support of axles for said wheels.

3. A vehicle as specified in claim 1 including a pair of longitudinally disposed load supporting members spaced inwardly from said inner longitudinally disposed bars and connected to said inner transverse load supporting bars to provide a bottom support for the load to be transported.

4. A vehicle as specified in claim 1 wherein the upwardly bent portions at one end of said inner longitudinally disposed bars are sized to extend past one of said first mentioned transverse bars and an inverted U-shaped handle member is attached to said portions of said inner bars extending past said transverse bar to provide an extension thereof.

5. A vehicle comprising a pair of transverse end bars, a pair of spaced outer longitudinal bars each having upwardly bent end portions connecting to said transverse bars, a pair of inner longitudinal bars spaced inwardly from and substantially parallel to said outer bars, and each having upwardly bent end portions connecting to said transverse bars, a pair of longitudinally spaced inner transverse load supporting bars each being connected at its ends to said pair of inner longitudinal bars adjacent the bent portions at opposite ends of the vehicle, said inner transverse bars comprising longitudinally spaced end supports for the load to be transported, axles carried by adjacent inner and outer longitudinal bars between the respective bent portions thereof, wheels carried on said axles, said longitudinal bars being free from connection with said spaced load supports along their spans between their bent end portions thereby serving as spring supports to absorb road shocks and keep the same from being transmitted to the load, said inner longitudinal bars being sized to cross one of said just mentioned transverse bars at one end of the vehicle and to extend therebeyond to provide handle receiving socket portions, an inverted U-shaped handle member having the extending ends thereof secured in said socket portions, a segment mounted on each leg of said U-shaped handle member having a plurality of indentations, and having a draw bar comprising a yoke, each end of which carries a retractable detent adapted to be received in said indentations, said draw bar being of a length to act as a supporting leg when in vertical position.

6. A knock down convertible toboggan type trailer comprising, an outer tubular frame of generally rectangular form having elevated transversely disposed end bars and longitudinally disposed side bars disposed therebelow with the end portions thereof bent upwardly and merged with said end bars, a pair of inner longitudinal bars spaced inwardly from said side bars and disposed, in elevation, intermediate said frame end bars and side bars, said pair of inner longitudinal bars having the end portions thereof upwardly bent and secured to said transversely disposed end bars, first bracket members mounted on the upper surface of each of said longitudinally disposed side bars intermediate the upwardly bent end portions thereof and second bracket members dependent from the undersurface of each of said inner longitudinal bars intermediate the upwardly bent end portions thereof, said first and second bracket members cooperatively forming a wheel supporting assembly disposed entirely above the undersurface of said longitudinally disposed side bars to permit utilization of the same as runners for toboggan type operation.

References Cited in the file of this patent

UNITED STATES PATENTS

| D. 143,510 | Silvera | Jan. 8, 1946 |
| D. 156,810 | Brownlee | Jan. 10, 1950 |
| 123,707 | Kind | Feb. 13, 1872 |
| 2,219,585 | Begin | Oct. 29, 1940 |
| 2,475,145 | Krause et al. | July 5, 1949 |
| 2,571,390 | Strand | Oct. 16, 1951 |
| 2,704,989 | Konecny | Mar. 29, 1955 |
| 2,715,030 | Peterson | Aug. 9, 1955 |

FOREIGN PATENTS

| 813,095 | Germany | Sept. 6, 1951 |
| 117,679 | Sweden | Nov. 17, 1946 |

(Corresponding Canadian Patent 462,621, Jan. 24, 1950)

| 185,014 | Switzerland | Feb. 16, 1937 |